(12) United States Patent
Lerner

(10) Patent No.: US 10,171,435 B1
(45) Date of Patent: *Jan. 1, 2019

(54) DEVICES THAT UTILIZE RANDOM TOKENS WHICH DIRECT DYNAMIC RANDOM ACCESS

(71) Applicant: Daniel Maurice Lerner, Missouri City, TX (US)

(72) Inventor: Daniel Maurice Lerner, Missouri City, TX (US)

(73) Assignee: IronClad Encryption Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,871

(22) Filed: Jun. 12, 2018

Related U.S. Application Data

(63) Continuation-in-part of application No. 16/005,040, filed on Jun. 11, 2018, and a continuation-in-part of
(Continued)

(51) Int. Cl.
*H04L 29/06* (2006.01)
*H04L 9/08* (2006.01)
(Continued)

(52) U.S. Cl.
CPC ........ *H04L 63/0457* (2013.01); *G06F 21/602* (2013.01); *G06F 21/62* (2013.01);
(Continued)

(58) Field of Classification Search
CPC .................................................. H04L 63/0457
See application file for complete search history.

(56) References Cited

U.S. PATENT DOCUMENTS

| 4,558,176 | A | * | 12/1985 | Arnold | .................... G06F 21/10 380/29 |
| 4,578,530 | A | | 3/1986 | Zeidler | |

(Continued)

FOREIGN PATENT DOCUMENTS

EP 1845652 A1 10/2007

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year: 2003).*
(Continued)

*Primary Examiner* — Bradley Holder
(74) *Attorney, Agent, or Firm* — Guerry L. Grune; ePatentManager.com

(57) ABSTRACT

The disclosure provides for one or more devices and associated system that securitize and conceal data transmitted to and/or data received from the devices that utilize one or more master keys comprising at least one device that conceals and reveals such that the data and/or associated data files utilize both master keys and one or more key selectors, wherein the master keys and key selectors produce a specific set of one or more keys that conceal the data and/or associated data files such that one or more key selectors coincide with at least one value that directly corresponds with created cipher data and/or cipher data files. The key selectors can also be concealed and revealed as required. Produced concealed data and concealed data files can only be concealed and revealed with one or more master keys and one or more key selectors.

29 Claims, 10 Drawing Sheets

Related U.S. Application Data application No. 16/005,134, filed on Jun. 11, 2018, and a continuation-in-part of application No. 16/005,281, filed on Jun. 11, 2018.

(60) Provisional application No. 62/540,266, filed on Aug. 2, 2017, provisional application No. 62/518,281, filed on Jun. 12, 2017, provisional application No. 62/518,337, filed on Jun. 12, 2017, provisional application No. 62/518,371, filed on Jun. 12, 2017.

(51) Int. Cl.
*H04L 9/16* (2006.01)
*G06F 21/62* (2013.01)
*G06F 21/60* (2013.01)

(52) U.S. Cl.
CPC .......... *H04L 9/0822* (2013.01); *H04L 9/0825* (2013.01); *H04L 9/0891* (2013.01); *H04L 9/16* (2013.01)

(56) References Cited

U.S. PATENT DOCUMENTS

| | | | | |
|---|---|---|---|---|
| 4,665,396 | A * | 5/1987 | Dieleman | G06Q 20/341 235/382 |
| 5,446,880 | A * | 8/1995 | Balgeman | G06F 17/30569 |
| 5,825,890 | A | 10/1998 | Elgamal et al. | |
| 6,157,722 | A | 12/2000 | Lemer et al. | |
| 6,466,780 | B1 | 10/2002 | Geiselman et al. | |
| 6,766,161 | B2 | 7/2004 | Geiselman et al. | |
| 6,917,974 | B1 * | 7/2005 | Stytz | H04L 63/04 709/225 |
| 6,959,086 | B2 | 10/2005 | Ober et al. | |
| 6,996,723 | B1 * | 2/2006 | Kyojima | H04L 9/0822 380/45 |
| 7,032,240 | B1 * | 4/2006 | Cronce | G06F 21/34 705/51 |
| 7,181,016 | B2 | 2/2007 | Cross et al. | |
| 7,382,883 | B2 | 6/2008 | Cross et al. | |
| 7,599,492 | B1 * | 10/2009 | Malyshev | H04L 9/0894 380/37 |
| 7,660,422 | B2 * | 2/2010 | Mitchell | H04L 9/083 380/277 |
| 8,462,955 | B2 | 6/2013 | Ureche et al. | |
| 8,825,999 | B2 | 9/2014 | Mohamed | |
| 9,094,191 | B2 | 7/2015 | Avanzi et al. | |
| 9,213,858 | B2 | 12/2015 | Sharma et al. | |
| 9,465,953 | B2 | 10/2016 | Shasrma et al. | |
| 9,521,123 | B2 | 12/2016 | Jueneman et al. | |
| 9,703,985 | B1 | 7/2017 | Sanchez | |
| 2002/0124177 | A1 * | 9/2002 | Harper | G06F 21/6245 713/189 |
| 2004/0022222 | A1 * | 2/2004 | Clisham | H04L 69/18 370/338 |
| 2004/0120404 | A1 * | 6/2004 | Sugahara | G10L 19/24 375/240.23 |
| 2004/0234073 | A1 * | 11/2004 | Sato | H04L 9/0891 380/28 |
| 2005/0015558 | A1 * | 1/2005 | Evans | G11C 7/1009 711/154 |
| 2005/0047600 | A1 * | 3/2005 | Newkirk | H04W 12/04 380/278 |
| 2005/0069139 | A1 * | 3/2005 | Higurashi | G06F 21/10 380/284 |
| 2005/0078825 | A1 | 4/2005 | Ohmori et al. | |
| 2005/0201564 | A1 * | 9/2005 | Kayashima | H04L 9/0891 380/283 |
| 2006/0233371 | A1 * | 10/2006 | Sowa | H04L 9/0822 380/248 |
| 2006/0235852 | A1 * | 10/2006 | Gaug | G06F 17/30545 |
| 2006/0258296 | A1 * | 11/2006 | Steer | G01S 7/021 455/67.13 |
| 2010/0106648 | A1 | 4/2010 | Choi et al. | |
| 2012/0198538 | A1 | 8/2012 | Spring et al. | |
| 2012/0314867 | A1 * | 12/2012 | Tomaru | H04L 9/08 380/270 |
| 2015/0195089 | A1 * | 7/2015 | Yajima | H04L 9/0869 380/46 |
| 2016/0112195 | A1 | 4/2016 | Jochheim et al. | |
| 2017/0012642 | A1 | 1/2017 | Declercq et al. | |
| 2017/0140175 | A1 * | 5/2017 | Angus | G06F 21/602 |

OTHER PUBLICATIONS

Papadimitratos et al.; Secure data communication in mobile ad hoc networks; Published in: IEEE Journal on Selected Areas in Communications ( vol. 24, Issue: 2, Feb. 2006 ); pp. 343-356; IEEE Xplore (Year: 2006).*

Russ, Eran. International Search Report. Israel Patent Office. dated Aug. 30, 2018, Jerusalem, Israel.

Russ, Eran. Written Opinion of the International Searching Authority. Israel Patent Office. dated Aug. 30, 2018, Jerusalem, Israel.

* cited by examiner

DEVICES THAT UTILIZE RANDOM TOKENS WHICH DIRECT DYNAMIC RANDOM ACCESS

PRIORITY STATEMENT

This application is a nonprovisional conversion of and takes priority under 119(e) of U.S. Provisional Application No. 62/540,266, filed Aug. 2, 2017 and entitled, "Selectable Key and Key Locator for A Hidden Dynamic Random Access Encryption System".

This application is also a continuation-in-part of U.S. Nonprovisional application Ser. No. 16/005,281 filed Jun. 11, 2018 and entitled, "User-Wearable Secured Devices Provided Assuring Authentication and Validation of Data Storage and Transmission", which is a nonprovisional conversion of 62/518,371 filed Jun. 12, 2017 and entitled, "User-Wearable Secured Devices Provided with Encryption Assuring Authentication and validation of Data Storage and Transmission".

This application is also a continuation-in-part of U.S. Nonprovisional application Ser. No. 16/005,134 filed Jun. 11, 2018 and entitled "Securitization of Temporal Digital Communications Via Authentication and Validation for Wireless User and Access Devices" which is a nonprovisional conversion of US Provisional Application entitled "Securitizing Temporal Digital Communications Via Authentication and Validation for Wireless User and Access Devices" with Ser. No. 62/519,337, filed Jun. 12, 2017.

This application is also a continuation-in-part of U.S. Nonprovisional application Ser. No. 16/005,040, filed Jun. 11, 2018 and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

FIELD OF THE INVENTION

The technical field comprises cyber security. More specifically, the present disclosure relates to the securitization of communications, and more particularly to a system that protects signals transmitted between devices to ensure that the communications are discoverable by only designated third parties. Methods and devices for encryption of these (primarily digital and normally two-way) communications using applications that may be combined with authorization and validation for receiving, storing, and retrieval of electronic, optical, and/or electro-optical communications in the form of voice, data, or optical transmissions are also included.

BACKGROUND

Various methods have attempted to authenticate, validate, securitize, and conceal communications. Most online transactions, for instance, are considered secure with often false assurances provided by the service providers employed to protect users' data and privacy. Unfortunately, in many if not all cases, these communications are protected with information private to a user and stored by a third-party. Since the more prevalent use of the internet in the late 1990's and most recently government system breaches since 2010, there has been continuous news reports regarding compromised private data, previously considered to be secure. This has sparked new awareness of communications and associated data vulnerability in the private, public, industrial, and government sectors.

The problem regarding transmitting personal and private information today requires the users of various devices including personal computers of all forms and smart phones to install and run special purpose client applications specifically designed for protecting information.

In addition, cryptographic methods to keep information shared among users, software, devices and the like, secure, are becoming more prevalent. Many judge just how secure a communication is by comparing encryption algorithms employed. Examples of encryption algorithms or computerized computations that are commercially used today include AES (Advanced Encryption Standard), Triple-DES (Data Encryption Standard), Blowfish, and RC4. Thus, the sheer number and variety of encryption methods provides questions regarding which encryption is best and how much encryption is enough.

Unfortunately, encryption alone does not ensure security and more importantly, privacy. Data that travels over "free and open" communication mediums such as cell phones and internet communications paths are perfect targets for interception. Many individuals and organizations believe (with a false sense of security) upon the pretense of their data being encrypted. Normally, encrypting the data with a pre-existing algorithm simply means that an equally outstanding algorithm is required to decrypt. Conversely, an easier method to decrypt exists that includes the use of keys. Much like the keys to a home, the strength of the encryption over these insecure "free and open" communication media are only as effective as the keys and the computerized computations that can encrypt and decrypt the keys to unlock the data. The principal is basic and simple; find the proper key, and unlock the door.

Two distinct encryption methods are widely used today: symmetric and asymmetric. Both utilize key-based computerized computations. Which method is more secure is the subject of much debate.

Symmetric cryptography (also known as private-key, single-key, secret-key, shared-key, and one-key encryption) exchanges "secret-keys" that are identical (or related computationally) to encrypt and decrypt data between two or more users. Types of symmetric key ciphers include block ciphers that input blocks of plaintext and stream ciphers that input individual characters. Popular examples of block cipher methods include TripleDES (Data Encryption Standard) and AES (Advanced Encryption Standard). RC4 is an example of a stream cipher.

For symmetric methods, the advantages are simplicity and speed. Users only have to specify a single key to encrypt or decrypt data. Symmetric cryptography is also much more resistant to brute force attacks and requires less computational power than its counterpart asymmetric cryptography. One major issue involving the use of this method is that "secret keys" must be shared via a secret communication channel, which is the very purpose of sharing secret keys in the first place, thus presenting a "chicken-and-egg" situation. In addition, the origin and authenticity of a message cannot be guaranteed, since both users use the same key, leaving this method, like many other cryptographic methods, open to "man-in-the-middle" attacks. Lastly, communication with every new user requires a new key to be shared to prevent compromise of a "universal key", thereby increasing the number of keys that have to be stored securely.

Another type of cryptography includes cryptographic hash functions. This method enables "digital signatures" to authenticate who a message is from and whether a message has been altered. Hash functions output a short hash of fixed length that is unique to a message and its author. Hash functions have gone through many mutations, culminating in 2012 when NIST (National Institute of Standards and Technology) announced an algorithm from Keccak that won a competition and is becoming the new Secure Hash Algorithm (SHA), called SHA-3.

Asymmetric cryptography is a method that enables two parties to secretly agree on a shared encryption key. Since proposed in a paper by Whitfield Diffie and Martin Hellman in 1976, the idea of cryptography using "public and private mathematically related keys", also known as asymmetric cryptography, has been become widely popular, especially for online communications. Asymmetric cryptography uses two keys. One key is shared publically between users to use for encryption, while the other key is kept private to use for decryption. A public key is derived from a private key in such a way that that the private key can decrypt data encrypted from a related public key, but not vice versa. No information about a private key can be derived from a public key.

The trade-offs for asymmetric methods include a chief advantage of asymmetric cryptography that includes the reduction in the number of unique secret keys that have to be shared between users requesting to communicate. Disadvantages of this method include computational cost, slower speeds, and the possibility for widespread compromise if just a single private key is compromised. Additionally, data may be irretrievable if a private key is lost. Also, asymmetric encryption is far more susceptible to brute force attacks than symmetric encryption. For example, AES 256 (symmetric encryption) is considered as strong as 15,360-bit methods using asymmetric encryption such as RSA (Rivest-Shamir-Adleman). Last and possibly most challenging is that the lack of authentication of public keys leaves the real possibility for man-in-the-middle attacks where a third party can impersonate an intended recipient by intercepting a sender's public key and exchange their own credentials with the sender without either the intended recipient nor the sender's knowledge.

Trusted 3rd Parties (Certificate Authorities) such as PKI (Public Key Infrastructure) and PGP (Pretty Good Privacy) are examples of asymmetric methods of encryption that rely upon some "trusted" authority to establish trust between peers over open communications such as the internet. These certificate authorities issue certificates that contain a public key of an entity and a cryptographic signature of the issuer, which is then passed to an intended recipient as evidence "they are who they say they are" (i.e. their "identity"). PGP and PKI differ in how they establish "trust." PKI is based upon predetermined "trusted" certificate authorities (CA) while PGP is based on a "web of trust" that allows users to choose who they trust.

Trade-offs for Certificate Authorities in a similar fashion to symmetric and asymmetric cryptography, include the fact that certificate authorities are vulnerable to man-in-the-middle attacks. If a certificate authority is compromised, another party can cause false certificates to be issued to impersonate another entity. For instance, in July 2012, NIST issued a warning that theft of certificates would allow attackers to issue new "valid" certificates and/or "sign" malware. Although 3rd party certificate authorities may add security in some circumstances, credibility of this method is diminished when reports of compromise surface. New methods such as certificate pinning causes man-in-the-middle attacks to be more difficult, but it can still be by-passed in many ways. Under this architecture, if the certificates are compromised, likely so are all sessions that utilize the certificates and their associated keys.

Several methods to improve cryptography as a means of mutual authentication include asymmetric/symmetric combinations, such as SSL and TLS, where symmetric private keys are shared within encryption by public keys. These methods still have the issue of a shared secret between entities. It has also been shown that a private key becomes more susceptible to disclosure the longer it is used with a public key (PKI). SSL/TLS overcomes the weaknesses of authentication with PKI by using Certificate Authorities to certify the identity of a server or entity, and then overcomes the weaknesses of the speed computational expense of PKI by negotiating a temporary symmetric key for rapid encryption and decryption during a communication session. This approach places emphasis on signature processes with certification authorities, which also has weaknesses as previously discussed.

Regardless of the cryptographic method used for encryption or authentication, an approach that ensures entities "are who they say they are" is needed for various scenarios, for example, when a device falls into the hands of an unauthorized user.

For such instances, many methods including biometrics have been promoted. The use of biometrics is becoming more prevalent and employs the same principle of key management for encryption and authentication.

Which cryptographic authentication and encryption methods are more secure is the subject of much debate. Regardless of the encryption method, the issue with encryption is that the keys still must be protected. Compromise of a private key, though unlikely, could prove catastrophic. Whether disclosure is a result of flawed implementations or a flawed protocol or architecture, recent disclosures of private data bring into focus the need for new approaches to guarantee authenticity and place control of data into the hands of the user to control the entity's secrets, keys, and private data. These encrypted and decrypted communications provide for special encryption techniques essential to denying fraudulent or otherwise unauthorized third parties with the ability to access sealed encrypted transmissions for data at rest as well as for data on the move. New approaches combined with data transmission devices are described in the present disclosure below.

BRIEF DESCRIPTION OF THE FIGURES

So that the above recited features and advantages of the present disclosure can be understood in detail, a more particular description of the invention and reference to embodiments are provided and illustrated in the appended figures. It is to be noted, however, that the appended drawings illustrate only typical embodiments of the present disclosure and are therefore not to be considered limiting the scope or other equally effective embodiments.

SUMMARY

Figure 1:
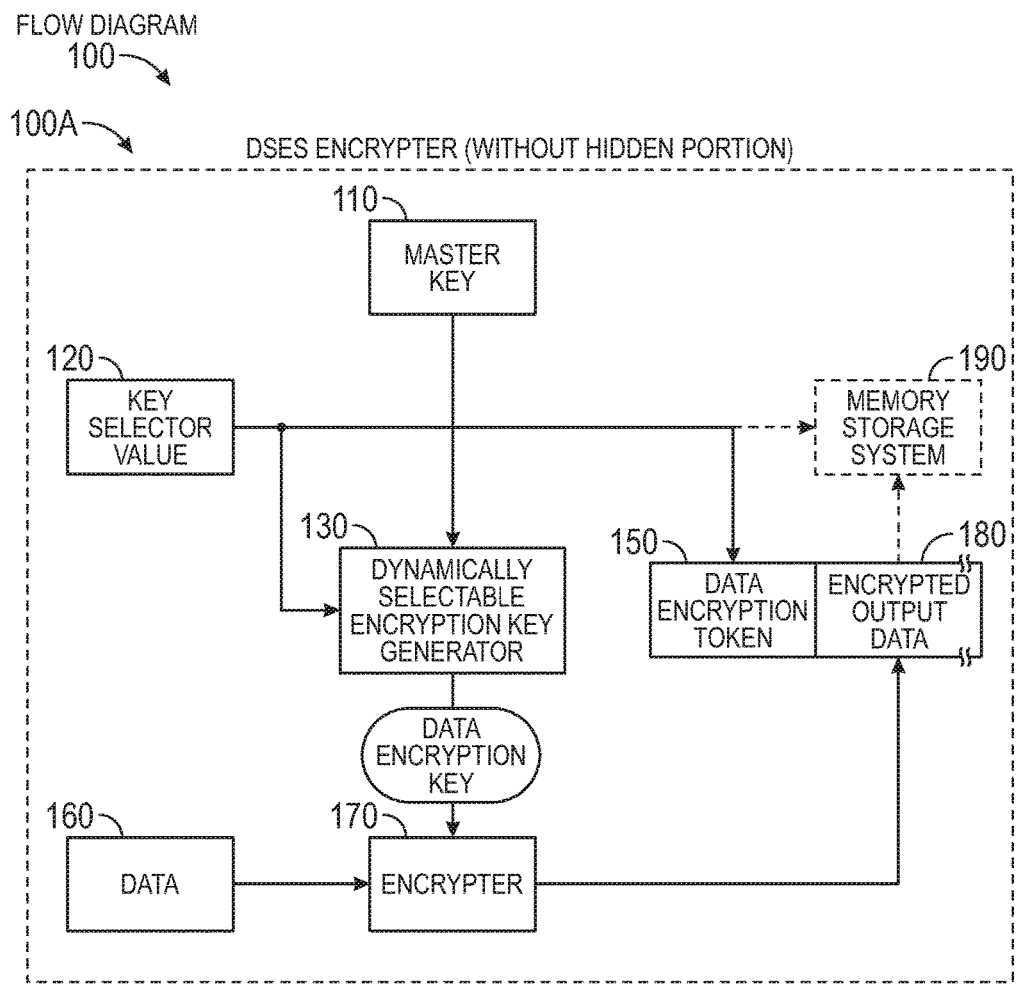
FIG. 1 is a flow diagram for the Dynamically Selectable Encryption System (DSES) without the Hidden Portion

One new approach combines data transmission devices which includes, utilizing encrypter and decrypter devices together with encryption and master keys as well as key selectors to assure safe and secure transmission. More specifically, the present disclosure provides for one or more devices that encrypt data transmitted to and/or decrypt data received from the devices that utilize one or more master keys comprising at least one encrypter and/or decrypter such that encryption and/or decryption of the data and/or associated data files utilize both master keys and one or more key selectors, wherein the master keys and key selectors produce a specific set of one or more encryption keys that encrypt and/or decrypt said data and/or associated data files such that one or more key selectors coincide with at least one value that directly corresponds with created cipher data and/or cipher data files, and wherein the key selectors can also be encrypted and decrypted, and wherein the key selectors and the cipher data and the cipher data files produces result data and result data files such that the cipher data and cipher data files together with the result data and result data files are sealed in that produced encrypted data and encrypted data files can only be encrypted and decrypted with one or more master keys and one or more key selectors.

In further embodiments the encryption keys and/or the key selectors are temporary, symmetric, and/or are asymmetric public and private key pairs such that the encryption keys can be paired with decryption keys.

In a further embodiment the key selectors are random which results in random encryption keys and decryption keys, wherein the random encryption and decryption keys are used to encrypt and decrypt data.

Here, the transmitted data is communications data. In addition, the encryption encrypts data at rest and/or the encryption encrypts data on the move before, during, and after transmission.

Further, the encryption keys can be coded keys that can be decoded and, as well, encryption keys are encrypted keys that can be decrypted.

Here, key selectors are provided such that the key selectors exist with and/or within a tolerance range, wherein tolerance is utilized to authenticate the validity of said key selectors.

Encryption and decryption keys are provided within the cypher data files and result data files.

The encryption keys can be dynamic encryption keys in that the dynamic encryption keys can continuously change form, address, specific position and location, within and/or external to the devices as well as remain capable of providing intended functions.

In all embodiments, the devices can be transceivers and can be real and/or virtual devices.

One operation of encryption of data within the devices requires at least one dynamically selectable encryption system (DSES) encrypter, a master key used by a dynamically selectable encryption key generator together with a key selector value that produces a data encryption key (KE) in a dynamic fashion and wherein the key selector value is sent to a decryption token, wherein the (DSES) encrypter receives data and encrypts said data according to at least one value corresponding with and/or contained by the data encryption key (KE). In addition the encrypted output data can be accepted from said DSES encrypter and wherein a combination of said decryption token and encrypted output data becomes available as encrypted communication signals. The DSES may possess a hidden portion and the hidden portion may include an indirect hidden portion In at least one embodiment, the encryption key (KE) maybe changed at any time based upon at least one value of said key selector that provides a key selector value.

For at least one configuration of the devices, the master key is a source for a first key derivation communication processor and a second key derivation communication processor wherein the first and second key derivation modules utilize information from the master key to provide variants of an original master key. In all cases here within, the terms module and communication processor are synonymous unless there is an illogical reference regarding use of the term communication processor in lieu of module.

The first key and second key derivation modules are distinguishable from each other in that they use unique initialization vectors and/or computerized computations to each produce uniquely different derived keys. The master key is provided to the first key derivation communication processor that is used by a dynamically selectable encryption key generator together with the key selector value to produce a data encryption key (KE) in a dynamic fashion.

The key selector value is sent to said encryption token which includes the use of an encryption token encrypter that encrypts a key selector value and produces a hidden decryption token.

In at least another embodiment, the encrypted encryption token is an indirect encrypted decryption token. The encrypted data is initially supplied in a form of plaintext.

For one operation of decryption of data within the devices the requirement is that there is at least one dynamically selectable decryption system (DSED) decrypter, a decryption token that becomes a key selector value, a master key used by a dynamically selectable decryption key generator that produces a decryption key (KD) in a dynamic fashion wherein the (DSED) decrypter receives data and decrypts the data according to a value coinciding with and/or contained by the decryption key (KD).

In another embodiment, the master key of the DSES has the same value as a matching master key for the DSED. The DSED may possess a hidden portion as well as an indirect hidden portion.

The decrypted output data is normally accepted from the DSED decrypter wherein a combination of the decryption token and a decrypted output data receiver becomes available as decrypted communication signals.

The decryption key (KD) maybe changed at any time based upon a value of the key selector that provides a key selector value. An encrypted decryption token can be sent to a decryption token decrypter along with the master key so that the decryption token decrypter decrypts the encrypted decryption token and produces the key selector value.

Here, the decrypted decryption token can be an indirect decrypted decryption token.

The master key is normally provided to the first key derivation communication processor that is used by a dynamically selectable encryption key generator together with the key selector value to produce a decryption key (KD) in a dynamic fashion.

In a further embodiment, an indirect encrypted decryption token wherein the token is sent to an indirect decryption token decrypter along with the second derivation communication processor so that the indirect decryption token decrypter decrypts the indirect encrypted decryption token and produces the key selector value.

In this case, the master key is provided to the first key derivation communication processor that is used by a dynamically selectable encryption key generator together with the key selector value to produce a decryption key (KD) in a dynamic fashion.

The decrypted data is initially supplied in a form of cypher-text and eventually decrypts data according to a value of the encryption key (KD) and produced in a form of plaintext.

In at least an additional embodiment, both values of an original key selector value and original data are available as decrypted communication signals from a key selector receiver and a decrypted output data receiver, respectively, and allow for secure transmission through a dynamic encryption/decryption tunnel.

Here, the decryption can be for dynamically encrypted data on the move.

In addition, for decryption of dynamically decrypted data at rest, a key selector that operates as a locater is utilized by a memory storage system as a block address to recover encrypted output data at that specific block address.

In at least one instance, every block of memory in the memory storage system is encrypted and decrypted with a unique encryption key (KE).

In a separate embodiment, the one or more devices that encrypt data transmitted to and/or decrypt data received from the devices that utilize one or more master keys comprises;

at least one dynamically selectable dynamic encryption encrypter (DSDES) with an indirect hidden portion such that encryption and/or decryption of the data and/or associated data files utilize both master keys and one or more key selectors, wherein the master keys and key selectors produce a specific set of one or more encryption keys that encrypt and/or decrypt said data and/or associated data files such that one or more key selectors coincide with at least one value that directly corresponds with created cipher data and/or cipher data files, and wherein the key selectors (locaters) can also be encrypted and decrypted, and wherein the key selectors and the cipher data and the cipher data files produces result data and result data files such that the cipher data and cipher data files together with the result data and result data files are sealed in that produced encrypted data and encrypted data files can only be encrypted and decrypted with one or more master keys and one or more key selectors.

In this instance, the first key and second key derivation modules exist and are distinguishable from each other in that they use unique initialization vectors and/or computerized computations to each produce uniquely different derived encryption keys such that the master keys are provided to the first key derivation communication processor that is used by a dynamically selectable encryption key generator together with a key selector value to produce a data encryption key (KE) in a dynamic fashion.

Here, the data encryption key (KE) maybe changed at any time based upon a change in a key selector value and in addition the master keys are provided to the second key derivation module.

The key selector value is sent to a data combiner along with control data from a dynamic encrypter that includes descriptive information about a nature of dynamic encrypted output data including length, padding, and encryption parameters.

In a further embodiment, a decryption token encrypter is provided that encrypts combined data from the data combiner and produces an indirect hidden dynamic decryption token such that a dynamic encrypter receives data which can be in a form of plaintext and encrypts said data according to a value provided by said encryption key (KE).

Here, the dynamic encrypter functions to provide new encryption keys for every block of encrypted data along with padding as required.

Encrypted data includes length, padding, and encryption parameters that are available for necessary decryption and supplied to a data combiner wherein dynamic encrypted output data is accepted from the dynamic encrypter that can be provided in a form of cyphertext.

A combination of indirect hidden dynamic decryption token and dynamic encrypted output data becomes available as dynamic encrypted communication signals that are result data and/or result data files.

In yet another embodiment of the present disclosure, one or more devices that encrypt data transmitted to and/or decrypt data received from the devices utilize one or more master keys comprises;

at least one dynamically selectable dynamic encryption decrypter (DSDDS) with an indirect hidden portion such that encryption and/or decryption of the data and/or associated data files utilize both master keys and one or more key selectors, wherein the master keys and key selectors produce a specific set of one or more encryption keys that encrypt and/or decrypt the data and/or associated data files such that one or more key selectors coincide with at least one value that directly corresponds with created cipher data and/or cipher data files, and wherein the key selectors can also be encrypted and decrypted, and wherein the key selectors and the cipher data and the cipher data files produce result data and result data files such that the cipher data and cipher data files together with the result data and result data files are sealed in that produced encrypted data and encrypted data files can only be encrypted and decrypted with one or more master keys and one or more key selectors.

Here, the master keys can be provided to a second key derivation module. In at least one instance, an indirect encrypted dynamic decryption token is sent to an indirect decryption token decrypter along with the second key derivation module.

In an additional embodiment, an indirect decryption token decrypter decrypts the indirect dynamic encrypted decryption token and sends it to a data splitter wherein the data splitter separates a key selector value from control data that is sent to a dynamic decrypter wherein the control data contains information including length, padding, and decryption parameters.

The master keys can be provided to a first key derivation communication processor that is used by a dynamically selectable decryption key generator together with said key selector value to produce a decryption key (KD) in a dynamic fashion.

The decryption key (KD) maybe changed at any time based upon a change in the key selector value, wherein the key selector value is sent to a key selector receiver.

In yet a further embodiment, a dynamic decrypter receives encrypted dynamic input data which may be in the form of cyphertext and decrypts the data according to a value of the decryption key (KD), wherein the dynamic decrypter functions to provide new decryption keys for every block of decrypted data along with padding as required.

Here, length, padding, and encryption parameters are available for necessary decryption and supplied by the data splitter.

In a further embodiment, a decrypted output data receiver receives data from the dynamic decrypter that is provided in a form of plaintext, such that both values of an original key selector and original data are available as decrypted communication signals from a key selector receiver and a decrypted output data receiver.

In summary, by using the techniques described above, communication signals using the devices and an associated dynamic encryption system(s) have been securely transmitted through a dynamic encryption/decryption tunnel. Specifically, the dynamically encrypted dynamic data is data on the move.

It is also important to note that for dynamically decrypted data at rest it is possible to utilize a key selector value obtained by a memory storage system as a block address to recover encrypted dynamic output data at the specific block address. Every block of memory in the memory storage system is encrypted and decrypted with a unique decryption key (KD), such that storing dynamically encrypted data at rest utilizes fixed data block sizes to obviate a need for including control data from said dynamic decrypter to complete decryption.

In a separate but directly related embodiment, the associated dynamic encryption system can also provide for a combination of at least two transceiver devices comprises; utilizing both encrypters and decrypters with memory such that communication signals from a first data source are sent through a first connection to a first transceiver, wherein the first transceiver securely connects encrypted data through the first connection via an unsecured network and a second transceiver securely connects encrypted data through a second connection also through an unsecured network, wherein communication signals from a second data source are sent through the second connection to the second transceiver so that it is possible to secure communication signals from a first source to a second source, and wherein signals enter the first transceiver through the first connection and travel to a (DSES) encrypter, that is controlled by at least one computer to dynamically encrypt and transmit communication signals to a (DSDS) decrypter via an unsecured network so that encrypted signals arrive at the second transceiver to the DSDS decrypter controlled by one or more computers, and wherein the (DSDS) decrypter decrypts the signals and sends them to the second source thorough the second connection, thereby sending secured signals from the first data source to the second data source that utilizes the dynamic encryption system. Here, the signals are normally communication signals.

The signals may be secured by sending the signals from a second source to a first source utilizing said (DSES) encrypter in the second transceiver and the (DSDS) decrypter in the second transceiver.

The encrypter, in at least one instance, is at least one dynamically selectable dynamic encryption encrypter (DSDES) with an indirect hidden portion. It is also possible that the decrypter is at least one dynamically selectable dynamic encryption decrypter (DSDDS) with an indirect hidden portion.

The system described above allows for a process for securing data in transit and may also be used for data at rest. For data at rest, for memory stored in storage devices, in order to securely store, seal and recover communication signals from a first data source, the first source must provide signals that enter the first transceiver through the first connection and travel to the (DSES) encrypter, wherein the (DSES) encrypter is controlled by one or more computers to dynamically encrypt, store, and seal communication signals to a first storage memory and recovers sealed storage signals from a first storage memory such that the one or more computers have access and can remove dynamically encrypted communication signals from the first storage memory and deliver said signals to the (DSDS) decrypter that dynamically decrypts communications signals allowing the unencrypted signals to be sent back to the first source through the first connection.

In addition, for data at rest, a second transceiver with a second data source can operate identically to the first transceiver. The system allows for securely transmitting, storing, sealing, and retrieving data such that at least one location of the data storage is provided within any storage device including devices internal or external to a network and associated transceivers.

To complete the summary of this disclosure, there is also provided a system with one or more devices that encrypt data transmitted to and/or decrypt data received from these devices that utilize one or more master keys comprising;

at least one encrypter and/or decrypter such that encryption and/or decryption of the data and/or associated data files utilize both master keys and one or more key selectors, wherein the master keys and key selectors produce a specific set of one or more encryption keys that encrypt and/or decrypt said data and/or associated data files such that one or more key selectors coincide with at least one value that directly corresponds with created cipher data and/or cipher data files, and wherein the key selectors can also be encrypted and decrypted, and wherein the key selectors and the cipher data and the cipher data files produces result data and result data files such that the cipher data and cipher data files together with the result data and result data files are sealed in that produced encrypted data and encrypted data files can only be encrypted and decrypted with one or more master keys and one or more key selectors.

Another embodiment includes a system with one or more devices that encrypt data transmitted to and/or decrypt data received from the devices that utilize one or more master keys that comprises; at least one dynamically selectable dynamic encryption encrypter (DSDES) with an indirect hidden portion such that encryption and/or decryption of the data and/or associated data files utilize both master keys and one or more key selectors.

Yet a further embodiment involves the use of a system with one or more devices that encrypt data transmitted to and/or decrypt data received from the devices that utilize one or more master keys comprising;

at least one dynamically selectable dynamic encryption decrypter (DSDDS) with an indirect hidden portion such that encryption and/or decryption of the data and/or associated data files utilize both master keys and one or more key selector.

DETAILED DESCRIPTION

While the foregoing discussion and summary has dealt primarily with encryption techniques and devices utilizing these techniques, the present disclosure also includes the ability to encrypt both data at rest and data on the move. As with the system for securing and encrypting temporal digital communications described in Provisional applications from which priority is taken 62/518,281, 62/518,337, and 62/518,371, the contents of which are hereby incorporated by reference for the encryption techniques described herein, it is also possible that one or more keys can be generated with one or more computerized computations from a subset of data with user specific information existing and residing outside a designated portion or pointer that corresponds with a record that could be a portion of an auto-synchronous (DASA) database or other data transmission, storage, and retrieval system. This system can include authorization and validation as required, but absolutely requires a set of rules that include encryption and decryption of the data.

The encryption application can be secured in a secured database within a secured cloud or other secured computer aided storage system that utilizes one or more of the group selected from a computer accessible cloud, network, internet, intranet, and at least one server.

In this application, the designated portion (which itself can be and should be encrypted) is included with the data or data packet(s) within data tables often utilizing headers or footers of those tables as the designated portion so that resynchronization is not required. If data and data packet transmission(s) are transmitted rapidly or in rapid succession, as long as the transceivers can receive and/or transmit the rapidly sent data, each set of data or data packet will have an "automatic" reset portion available in case issues with synchronization arise.

In addition, because the designated portion is being carried with the data packet, this encryption system allows for random access into data at rest.

For data on the move (including streaming data) using randomized designated portion(s), this effectively creates a random key process meaning we are selecting keys randomly rather than pseudo randomly. The encryption system is picking keys out of a static (data) table, but picking those keys out randomly, which translates into a completely random key selection process.

Encryption and decryption of data transmission utilizes keys such that computerized computations produce keys from any combination of a group consisting of; record numbers, recorded time, and random numbers wherein one or more algorithmically produced keys exist and allow for generation of one or more identical encryption keys using an identical algorithm for decryption. Encryption of one or more algorithmically produced keys may exist within one or more databases.

For the present encrypted devices and associate encryption techniques, the encrypters and the decrypters are the engines for these devices and associated system. For most known encryption systems, there are two data inputs; plain text and a key input that results in cypher text as the output.

In the present disclosure, we have introduced an encryption key selector. This allows for selection and provisions of one or more encryption keys for each segment of data (bit by bit or byte by byte). We can then take the key selector and combine it with encrypted data. On the decryption (output) side, at the other end, the encrypter key selector becomes a decrypter and reverses the process.

The ability to have random access key index lookup tables with data bits that include every possible combination of all the bits is desirable. Of all the possible bits or combinations (use of computerized computations to achieve a Pseudo random number generator—which is insufficient for random access as it only allows for a forward step function), this key selector does select the nth key in the access key index lookup table and that key is used to encrypt a specific set of data. Here the algorithm(s) could be block encrypters, like AES, etc., or a hash function, or some other function by direct calculation. Therefore, the first feed key and encryption selector produce a number.

There are at least two (2) inputs to a block encrypter. These inputs include at least data and at least one key. The output is encrypted data but the actual function is the block encrypter which is providing a table lookup of all the possible data states for the key. This includes a unique vector (or the equivalent of a single dimensioned data array) for each possible key over the range of every possible input data value. This means the length of the array is equivalent to the full possible range of data values. The table is a matrix with a vector containing rows and columns of data that possesses every single number or pairs of numbers for every possible data input and every possible key. Every key has a row for every single possible data value and the output is encrypted data that is subsequently used as a key that then can be used for encryption of the actual data and data path. Using a block decrypter is not the only method for generating a useful transformation of the two inputs (data and key) to produce a key lookup table.

In at least one embodiment each and every instance of transmitting data generates a new set of keys (one or more pairs) without transmitting a new set of keys from the device(s).

When databases are utilized, they can be encrypted to protect against unauthorized access of any single or all database(s). Protection of the database(s) are provided by utilizing a system key for each device so that the device(s) are allowed access to the system In the event resynchronization is not perfected, tolerance of the designated portion can also be provided when data is in transit from the designated portion to the devices.

Here, tolerance provides a desired range within which the system operates and tolerance utilizes one or more record numbers via one or more computerized computations that encrypt and decrypt data. The tolerance is increased in complexity by applying a more stringent check of additional records within a designated portion.

For these systems, the transceivers can communicate internally or externally by transmitting and receiving data utilizing one or more encryption application(s) and wherein either or both of the transceivers can act as detecting devices that search, retrieve, and analyze a recognizable securitized and encrypted data signal generated after installation of the encryption application(s) is complete.

In at least one instance, the data can be contained within a token. The token is recognized by either transceivers which may control many different functions including access to one or more locations, switching on and off different devices, allowing payment or selection of various components associated with the internet of things (IOT), etc.

The data can be provided as code, the code selected from the group consisting of; a QR code, a bar code, a digital code, an analogue code, and a 7-bit binary code.

The transceivers are intelligent in that the transceivers are computerized and possess memory.

The transceivers can be selected from a group consisting of cellular phones, cameras, infrared transmitters, optical transmitters, Wi-Fi transmitters, Bluetooth transmitters, ultra-wide band nearfield transmitters, communication transmitters, radiation transmitting devices, magnetic strips, and smart chips, automobiles, airplanes, ships including boats and other vehicles capable of transporting on, in, and/or through water.

The transceivers may also contain sensors selected from the group consisting of RFIDs, gyro sensors, magnetic field sensors electromagnetic field sensors, electrical optical infrared sensors, radar sensors, LIDAR sensors, inclination accelerometers, inclinometers, cameras, and bio-sensors.

In at least one instance, the transceivers may be cellular phones with or without a camera. Further, the cellular phone is a smart phone in that it can access, interact with, and display internet provided data as well provide GPS guidance and allow for computational search, retrieval, and analysis of data derived from, residing within, or accessed by the smart phone.

The transceivers can be further selected from the group consisting of; controllers and switches that control a flow of energy in signal form to and from devices including; lights, all forms of transportation vehicles including aerospace vehicles; elevators and escalators, electrical switches, and electrical contacts and wherein the controllers and switches are further selected from the group consisting of; rheostats, thermostats, and transformers, wherein the controllers and switches are selectively manipulated to operate and control the devices within a specified range.

The present disclosure involves dynamically selectable keys and key locators utilizing both a Hidden and Un-Hidden Random Access Encryption System, which is described in further detail below.

Specifically, FIG. 1 is a flow diagram (100) for operation of the Dynamically Selectable Encryption System (DSES) Encrypter (100A) without the Hidden Portion. The master key (110) is used by a dynamically selectable encryption key generator (130) together with the key selector value (120) to produce a data encryption key (KE) in a dynamic fashion. The key (KE) maybe changed at any time based upon a change in the key selector value (120). The key selector value (120) is sent to the decryption token (150). Encrypter (170) receives data (160) which may be in the form of plaintext and encrypts the data according to the value of the key (KE). Encrypted output data (180) is accepted from encrypter (170) which may be provided in the form of cyphertext. The combination of the decryption token (150) and the encrypted output data (180) now becomes available as encrypted communication signals.

The encryption process described above is for dynamically encrypted data on the move. For dynamically encrypted data at rest, shown as an optional feature by using dashed lines, the decryption token (150) is utilized by a memory storage system (190) as the block address to store the encrypted output data (180) at that specific block address. In this manner every block of memory in the memory storage system is encrypted with a unique encryption key (KE).

Figure 2:
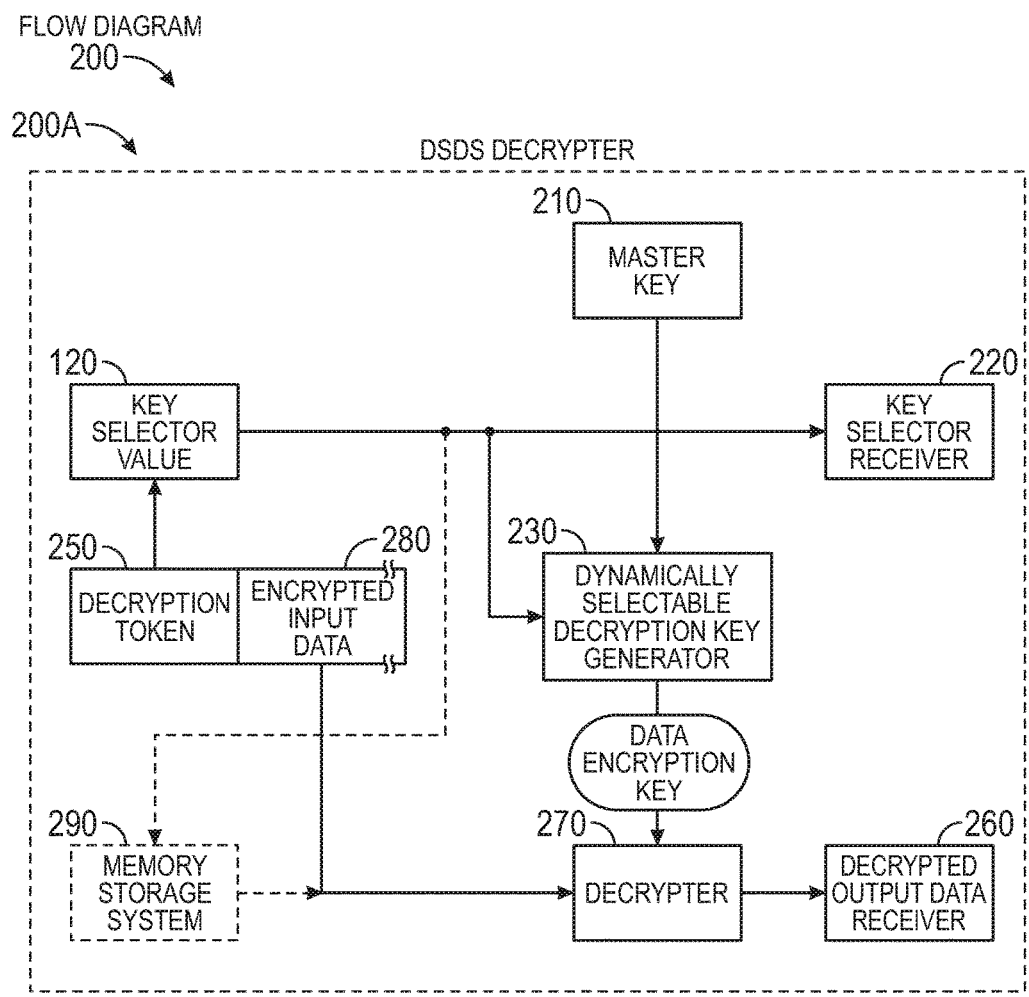
FIG. 2 is a flow diagram for the Dynamically Selectable Decryption System (DSDS) without the Hidden Portion

FIG. 2 is a flow diagram (200) for operation of the Dynamically Selectable Decryption System (DSDS) Decrypter (200A) without the Hidden Portion. The master key (210) has the same value as its matching master key (110) for the DSES as described in FIG. 1. The combination of the decryption token (150) and the encrypted output data (180) which has become available as communication signals (see FIG. 1) are received as a decryption token (250) and as encrypted input data (280).

The decryption token (250) becomes the key selector value (120). The master key (210) is used by a dynamically selectable decryption key generator (230) together with the key selector value (120) to produce a decryption key (KD) in a dynamic fashion. The decryption key (KD) maybe changed at any time based upon the value of the key selector (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector value (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted data on the move. For dynamically decrypted data at rest, shown as an optional feature by using dashed lines, the key locater (120) is utilized by a memory storage system (290) as the block address to recover the encrypted output data (180) at that specific block address. In this manner every block of memory in the memory storage system is encrypted and decrypted with a unique encryption key (KE).

Figure 3:
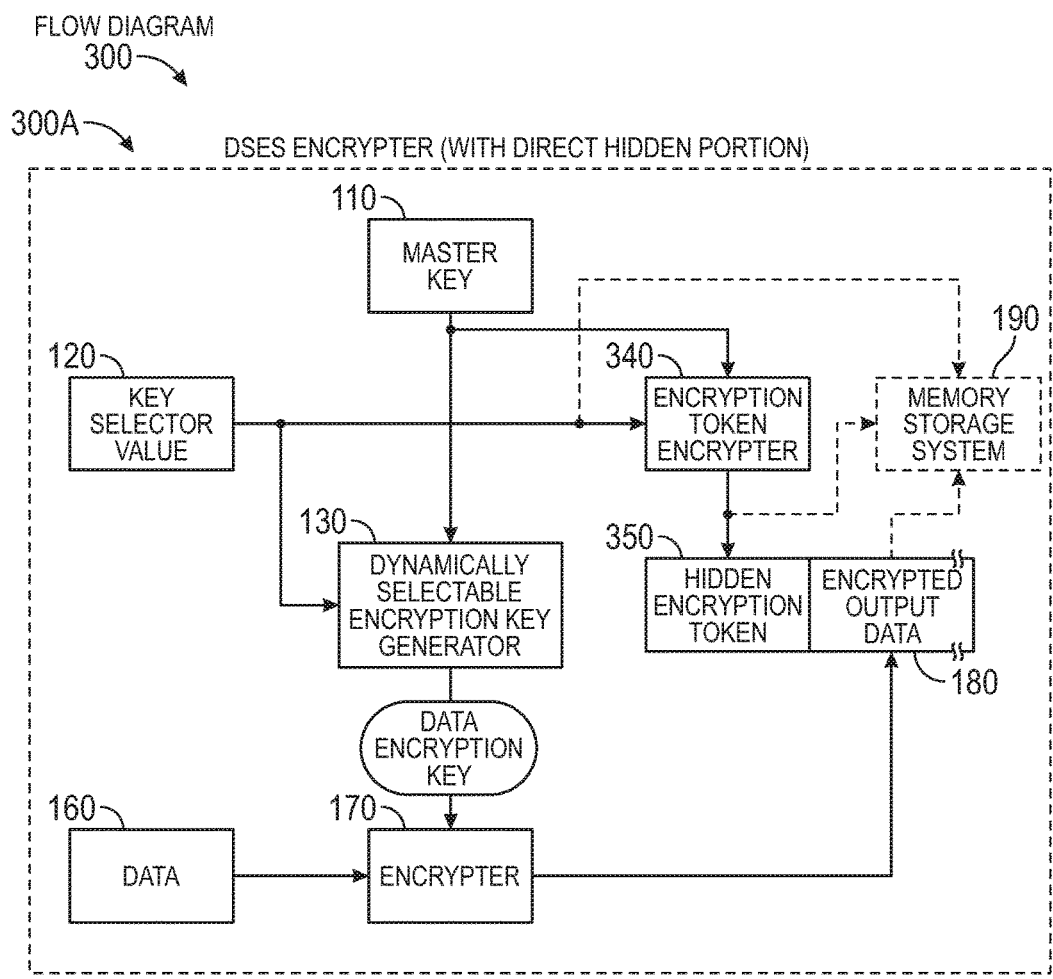
FIG. 3 is a flow diagram that describes the Dynamically Selectable Encryption System (DSES) with the Hidden Portion

FIG. 3 is a flow diagram (300) for operation of the Dynamically Selectable Encryption System (DSES) Encrypter (300A) with a Direct Hidden Portion. The master key (110) is used by a dynamically selectable encryption key generator (130) together with the key selector (120) to produce a data encryption key (KE) in a dynamic fashion. The key (KE) maybe changed at any time based upon a change in the key selector value (120). The key selector value (120) is sent to an encryption token encrypter (340) along with the master key (110). The encryption token encrypter (340) encrypts the key selector value (120) and produces a hidden encryption token (350). Encrypter (170) receives data (160) which may be in the form of plaintext and encrypts the data according to the value of the key (KE). Encrypted output data (180) is accepted from encrypter (170) which may be provided in the form of cyphertext. The combination of the hidden encryption token (350) and the encrypted output data (180) now becomes available as encrypted communication signals.

The encryption process described above is for dynamically encrypted data on the move. For dynamically encrypted data at rest, shown as an optional feature by using dashed lines, the key selector value (120) or the hidden decryption token (350) is utilized by a memory storage system (190) as the block address to store the encrypted output data (180) at that specific block address. In this manner every block of memory in the memory storage system is encrypted with a unique encryption key (KE).

Figure 4:
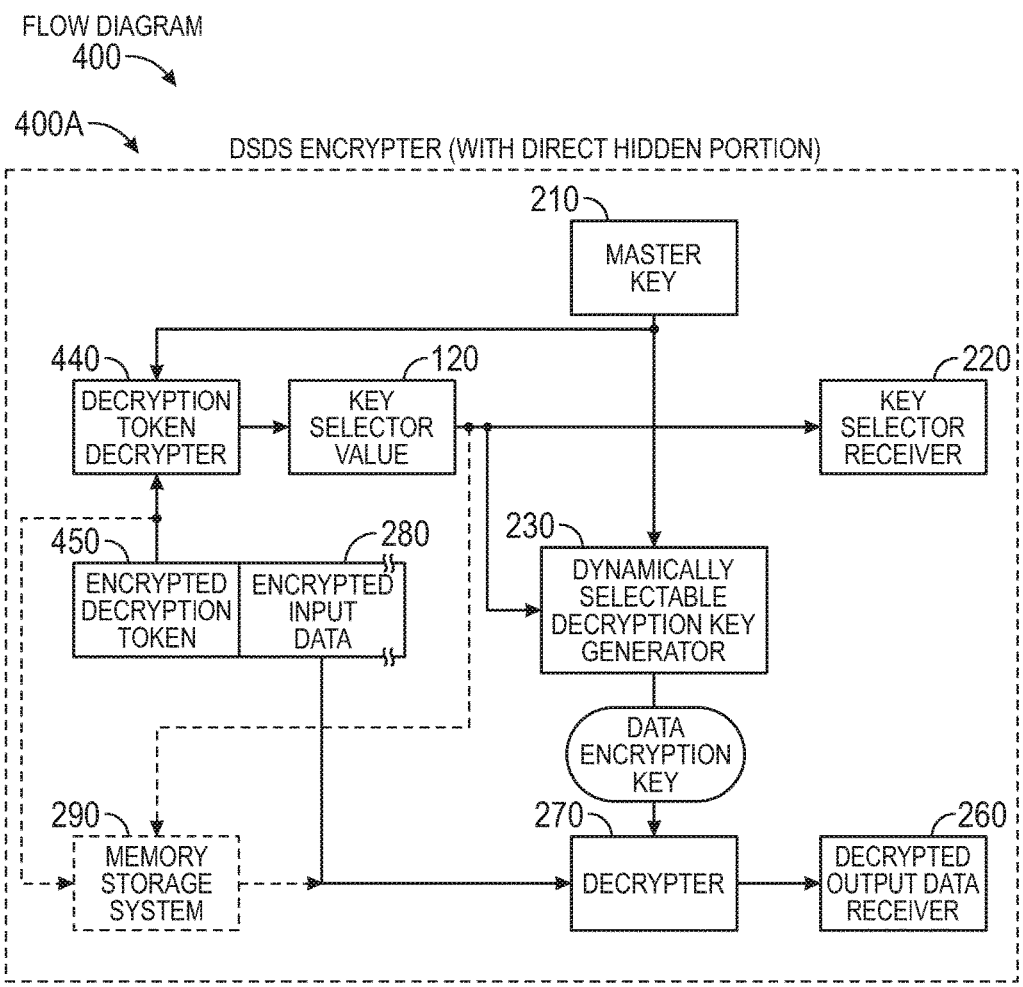
FIG. 4 is a flow diagram that describes the Dynamically Selectable Decryption System (DSDS) with the Hidden Portion

FIG. 4 is a flow diagram (400) for operation of the Dynamically Selectable Decryption System (DSDS) Decrypter (400A) with a Direct Hidden Portion. The master key (210) has the same value as its matching master key (110) for the DSES as described in FIG. 1. The combination of the hidden encryption token (350) and the encrypted output data (180) which has become available as communication signals (see FIG. 3) are received as an encrypted decryption token (450) and as encrypted input data (280).

The encrypted decryption token (450) is sent to a decryption token decrypter (440) along with the master key (210). The decryption token decrypter (440) decrypts the encrypted decryption token (450) and produces the key selector value (120). The master key (210) is used by a dynamically selectable decryption key generator (230) together with the key selector value (120) to produce a decryption key (KD) in a dynamic fashion. The decryption key (KD) maybe changed at any time based upon the value of the key selector value (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted data on the move. For dynamically decrypted data at rest, shown as an optional feature by using dashed lines, the key selector value (120) or the encrypted decryption token (450) is utilized by a memory storage system (290) as the block address to recover the encrypted output data (180) at that specific block address. In this manner every block of memory in the memory storage system is encrypted and decrypted with a unique encryption key (KE).

Figure 5:
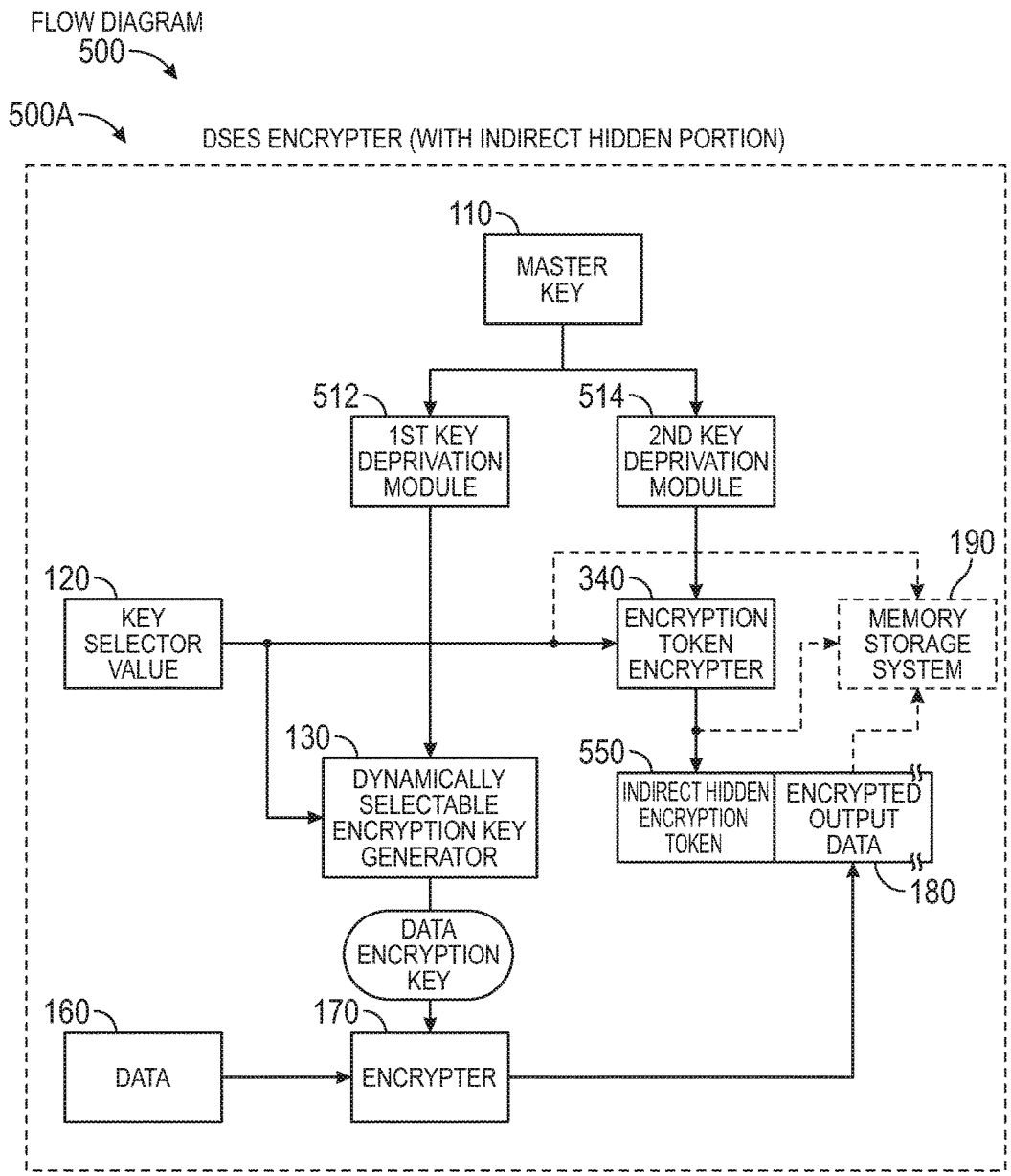
FIG. 5 is a flow diagram that describes the Dynamically Selectable Encryption System (DSES) with and Indirect Hidden Portion

FIG. 5 is a flow diagram (500) for operation of the Dynamically Selectable Encryption System (DSES) Encrypter (500A) with an Indirect Hidden Portion. The master key (110), in this configuration, is the source for a first key derivation communication processor (512) and second key derivation communication processor (514). These key derivation modules (512, 514) utilize information from the master key (110) to provide variants of the original master key (110). The first key and second key derivation modules (512, 514) are distinguishable from each other in that they use unique initialization vectors and/or computerized computations to each produce uniquely different derived keys. The master key (110) is provided to the first key derivation communication processor (512) that is used by a dynamically selectable encryption key generator (130) together with the key selector value (120) to produce a data encryption key (KE) in a dynamic fashion. The key (KE) maybe changed at any time based upon a change in the key selector value (120). In addition the same master key (110) is provided to the second key derivation communication processor (514). The key selector value (120) is sent to a decryption token encrypter (340) along with the second key derivation communication processor (514). The decryption token encrypter (340) encrypts the key selector value (120) and produces an indirect hidden encryption token (550). Encrypter (170) receives data (160) which may be in the form of plaintext and encrypts the data according to the value of the key (KE). Encrypted output data (180) is accepted from encrypter (170) which may be provided in the form of cyphertext. The combination of the indirect hidden encryption token (550) and the encrypted output data (180) now becomes available as encrypted communication signals.

The encryption process described above is for dynamically encrypted data on the move. For dynamically encrypted data at rest, shown as an optional feature by using dashed lines, the key selector value (120) or the indirect hidden encryption token (550) is utilized by a memory storage system (190) as the block address to store the encrypted output data (180) at that specific block address. In this manner every block of memory in the memory storage system is encrypted with a unique encryption key (KE).

Figure 6:
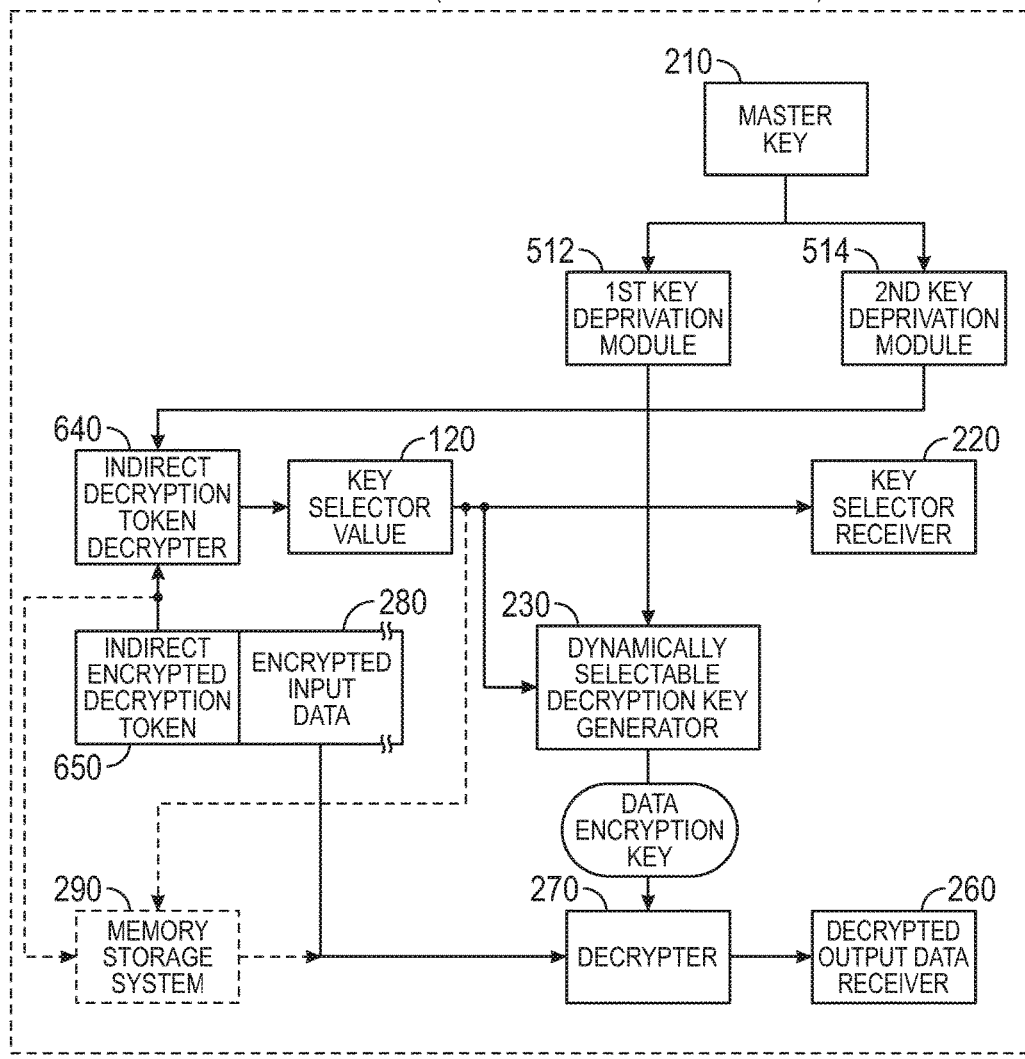
FIG. 6 is a flow diagram that describes the Dynamically Selectable Decryption System (DSDS) with and Indirect Hidden Portion

FIG. 6 is a flow diagram (600) for operation of the Dynamically Selectable Decryption System (DSDS) Decrypter (600A) with an Indirect Hidden Portion. The master key (210) has the same value as its matching master key (110) for the DSES as described in FIG. 1. The master key (210), in this configuration, is the source for a first key derivation communication processor (512) and second key derivation communication processor (514). These key derivation modules (512, 514) utilize information from the master key (210) to provide variants of the original master key (210). As in FIG. 5, the first key and second key derivation modules (512, 514) are distinguishable from each other in that they use unique initialization vectors and/or computerized computations to each produce uniquely different derived keys.

The combination of the indirect hidden encryption token (550) and the encrypted output data (180) which has become available as communication signals (see FIG. 5) are received as an indirect encrypted decryption token (650) and as encrypted input data (280).

The master key (210) is provided to the second key derivation communication processor (514). The indirect encrypted decryption token (650) is sent to an indirect decryption token decrypter (640) along with the second derivation communication processor communication processor (514). The indirect decryption token decrypter (640) decrypts the indirect encrypted decryption token (650) and produces the key selector value (120).

The master key (210) is provided to the first key derivation communication processor (512) that is used by a dynamically selectable decryption key generator (230) together with the key selector value (120) to produce a decryption key (KD) in a dynamic fashion. The key (KD) maybe changed at any time based upon a change in the key selector value (120). The key selector value (120) is sent to the key selector receiver (220).

Decrypter (270) receives encrypted input data (280) which may be in the form of cyphertext and decrypts the data according to the value of the decryption key (KD). Decrypted output data receiver (260) from decrypter (270) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted data on the move. For dynamically decrypted data at rest, shown as an optional feature by using dashed lines, the key selector value (120) or the indirect encrypted decryption token (650) is utilized by a memory storage system (290) as the block address to recover the encrypted output data (280) at that specific block address. In this manner every block of memory in the memory storage system is encrypted and decrypted with a unique encryption key (KE).

Figure 7:
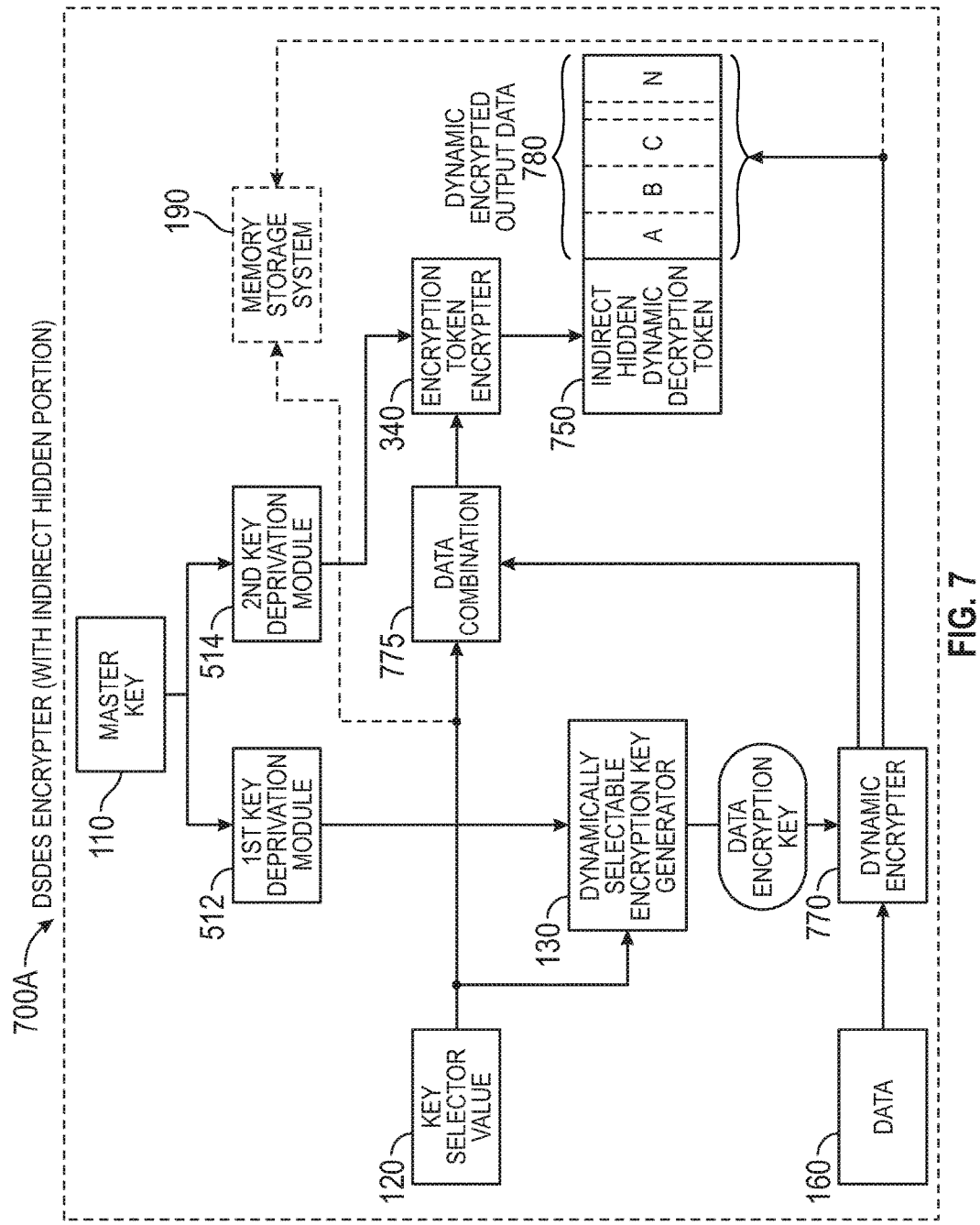
FIG. 7 is a flow diagram that provides one example of a detailed End-to-End Hidden Encryption System Utilizing a Sophisticated Dynamic Encrypter

FIG. 7 is a flow diagram for operation of the Dynamically Selectable Dynamic Encryption System (DSDES) Encrypter (700A) with an Indirect Hidden Portion. The master key (110), in this configuration, is the source for a first key derivation communication processor (512) and second key derivation communication processor (514). These key derivation modules (512, 514) utilize information from the master key (110) to provide variants of the original master key (110). The first key and second key derivation modules (512, 514) are distinguishable from each other in that they use unique initialization vectors and/or computerized computations to each produce uniquely different derived keys. The master key (110) is provided to the first key derivation communication processor (512) that is used by a dynamically selectable encryption key generator (130) together with the key selector value (120) to produce a data encryption key (KE) in a dynamic fashion. The key (KE) maybe changed at any time based upon a change in the key selector value (120). In addition the same master key (110) is provided to the second key derivation communication processor (514). The key selector value (120) is sent to a data combiner (775) along with control data from the dynamic encrypter (770) that includes descriptive information about the nature of dynamic encrypted output data (780) such as length, padding, and encryption parameters. The decryption token encrypter (340) encrypts the combined data from the data combiner (775) and produces an indirect hidden dynamic decryption token (750). Dynamic encrypter (770) receives data (160) which may be in the form of plaintext and encrypts the data according to the value of the key (KE). The dynamic encrypter functions to provide new encryption keys for every block of encrypted data of some length along with padding to further adjust the data (string) length as required. The length, padding, and encryption parameters are available for proper decryption and supplied to the data combiner (775). Dynamic encrypted output data (780) is accepted from dynamic encrypter (770) which may be provided in the form of cyphertext. The combination of the indirect hidden dynamic decryption token (750) and the dynamic encrypted output data (780) now becomes available as dynamic encrypted communication signals.

The dynamic encryption process described above is for dynamically encrypted data on the move. For dynamically encrypted data at rest, shown as an optional feature by using dashed lines, the key selector value (120) is utilized by a memory storage system (190) as the block address to store the dynamic encrypted output data (780) at that specific block address. In this manner every block of memory in the memory storage system is encrypted with a unique encryption key (KE). In the case of storing dynamically encrypted data at rest, fixed data block sizes are used that obviates the need for including control data from the dynamic encrypter (770) for completing decryption.

Figure 8:
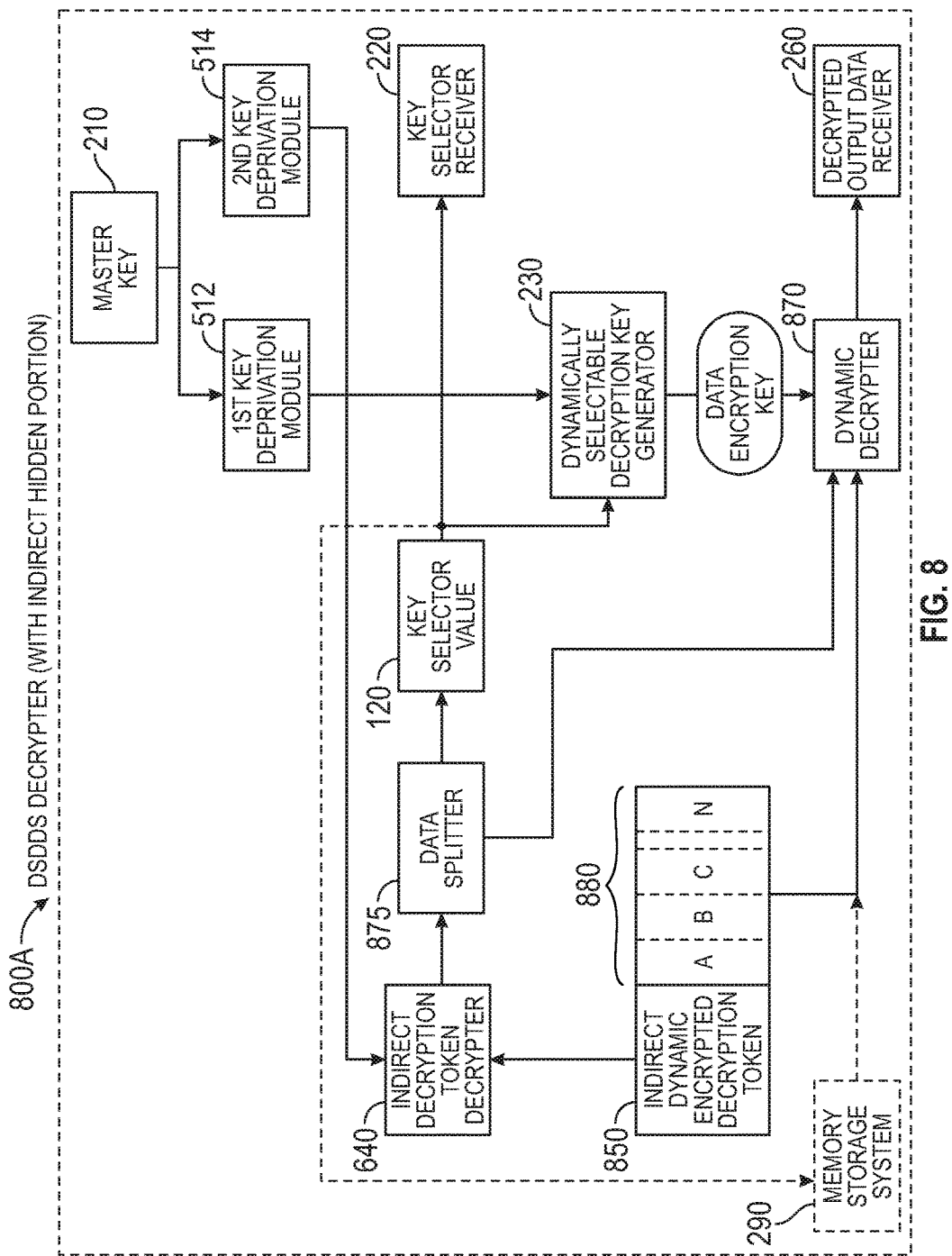
FIG. 8 is a flow diagram that provides one example of a detailed End-to-End Hidden Encryption System Utilizing a Sophisticated Dynamic Decrypter

FIG. 8 is a flow diagram for operation of the Dynamically Selectable Dynamic Decryption System (DSDDS) Decrypter (800A) with an Indirect Hidden Portion. The master key (210) has the same value as its matching master key (110) for the DSES as described in FIG. 1. The master key (210), in this configuration, is the source for a first key derivation communication processor (512) and second key derivation communication processor 514). These key derivation modules (512, 514) utilize information from the master key (210) to provide variants of the original master key (210). As in FIG. 5, the first key and second key derivation modules (512, 514) are distinguishable from each other in that they use unique initialization vectors and/or computerized computations to each produce uniquely different derived keys.

The combination of the indirect hidden dynamic decryption token (750) and the dynamic encrypted output data (780) which has become available as communication signals (see FIG. 7) are received as an indirect dynamic encrypted decryption token (850) and as dynamic encrypted input data (880).

The master key (210) is provided to the second key derivation communication processor (514). The indirect encrypted dynamic decryption token (850) is sent to an indirect decryption token decrypter (640) along with the second derivation communication processor (514).

The indirect decryption token decrypter (640) decrypts the indirect dynamic encrypted decryption token (850) and sends it to the data splitter (875). The data splitter (875) separates the key selector value (120) from the control data which is sent to dynamic decrypter (870). The control data contains information such as length, padding, and decryption parameters.

The master key (210) is provided to the first key derivation communication processor (512) that is used by a dynamically selectable decryption key generator (230) together with the key selector value (120) to produce a decryption key (KD) in a dynamic fashion. The key (KD) maybe changed at any time based upon a change in the key selector value (120). The key selector value (120) is sent to the key selector receiver (220).

Dynamic decrypter (870) receives encrypted dynamic input data (880) which may be in the form of cyphertext and decrypts the data according to the value of the decryption key (KD). The dynamic decrypter (870) functions to provide new decryption keys for every block of decrypted data along with padding as required. The length, padding, and encryption parameters are available for proper decryption and supplied by the data splitter (875). Decrypted output data receiver (260) from dynamic decrypter (870) may be provided in the form of plaintext. Both the values of the original key selector (120) and the original data (160) are available as decrypted communication signals from the key selector receiver (220) and the decrypted output data receiver, (260), respectively. At this point the communication signals using devices and the associated system have been securely transmitted through a dynamic encryption/decryption tunnel.

The decryption process described above is for dynamically encrypted dynamic data on the move. For dynamically decrypted data at rest, shown as an optional feature by using dashed lines, the key selector value (120) is utilized by a memory storage system (290) as the block address to recover the encrypted dynamic output data (880) at that specific block address. In this manner every block of memory in the memory storage system is encrypted and decrypted with a unique decryption key (KD). In the case of storing dynamically encrypted data at rest, fixed data block sizes are used that obviates the need for including control data from the dynamic decrypter (870) for completing decryption.

Figure 9:
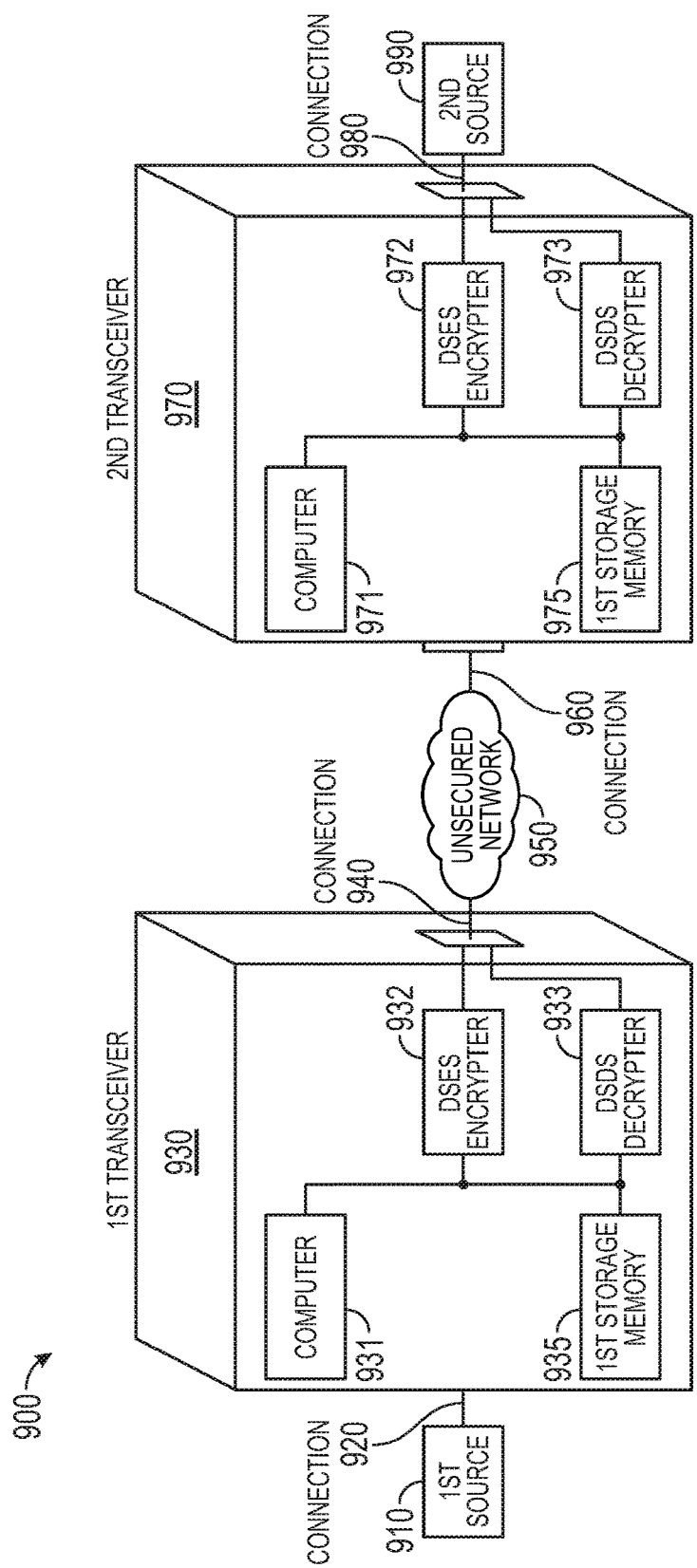
FIG. 9 is a schematic that provides at least one embodiment that illustrates the combination of two transceiver devices utilizing both encrypters and decrypters

FIG. 9 is a schematic (900) depicting the combination of two transceiver devices utilizing both encrypters and decrypters with memory. Communication signals from a first source (910) are sent through connection (920) to the first transceiver (930). The first transceiver (930) securely connects encrypted data through connection (940) through unsecured network (950). The second transceiver (970) securely connects encrypted data through another connection (960) through unsecured network (950). Communication signals from a second source (990) are sent through connection (980) to the second transceiver (970).

In order to secure communication signals from the first source (910) to the second source (990), the following process is required. The signals (910) enter the first transceiver (930) through connection (920) and travel to the (DSES) Encrypter (932). The (DSES) Encrypter (932) is controlled by the computer (931) to dynamically encrypt and transmit the communication signals to the DSDS Decrypter (973) via an unsecured network (950). Encrypted signals arrive at the second transceiver (970) to the DSDS Decrypter (973) controlled by computer (971). DSDS Decrypter (973) decrypts the signals and sends them to the second source (990) thorough connection (980). This accomplishes sending secured signals from a first source (910) to a second source (990) by utilizing the dynamic encryption system of the present disclosure. The communication signals can be conversely secured by sending them from the second source (990) to the first source (910) utilizing the DSES Encrypter (972) in the second transceiver (970) as well as the DSDS Decrypter (933) in the first transceiver (930). This completes the process for securing data in transit.

For data at rest for memory stored in storage devices, in order to securely store, seal and recover communication signals from the first source (910), the process described below is required. The first source (910) provides signals that enter the first transceiver (930) through the connection (920) and travel to the (DSES) Encrypter (932). The (DSES) Encrypter (932) is controlled by the computer (931) to dynamically encrypt, store and seal the communication signals to a first storage memory (935). To recover sealed storage signals from the first storage memory (935), the computer (931) removes dynamically encrypted communication signals from the first storage memory (935) and delivers the signals to the DSDS decrypter (933) which dynamically decrypts the signals allowing the unencrypted signals to flow back to the first source (910) through connection (920). The same process as described regarding data at rest is followed within the second transceiver (970) and second source (990), with the exception that the first storage memory for the second transceiver (970) is listed as (975) which is essentially equivalent to the first storage memory (935).

Figure 9A:
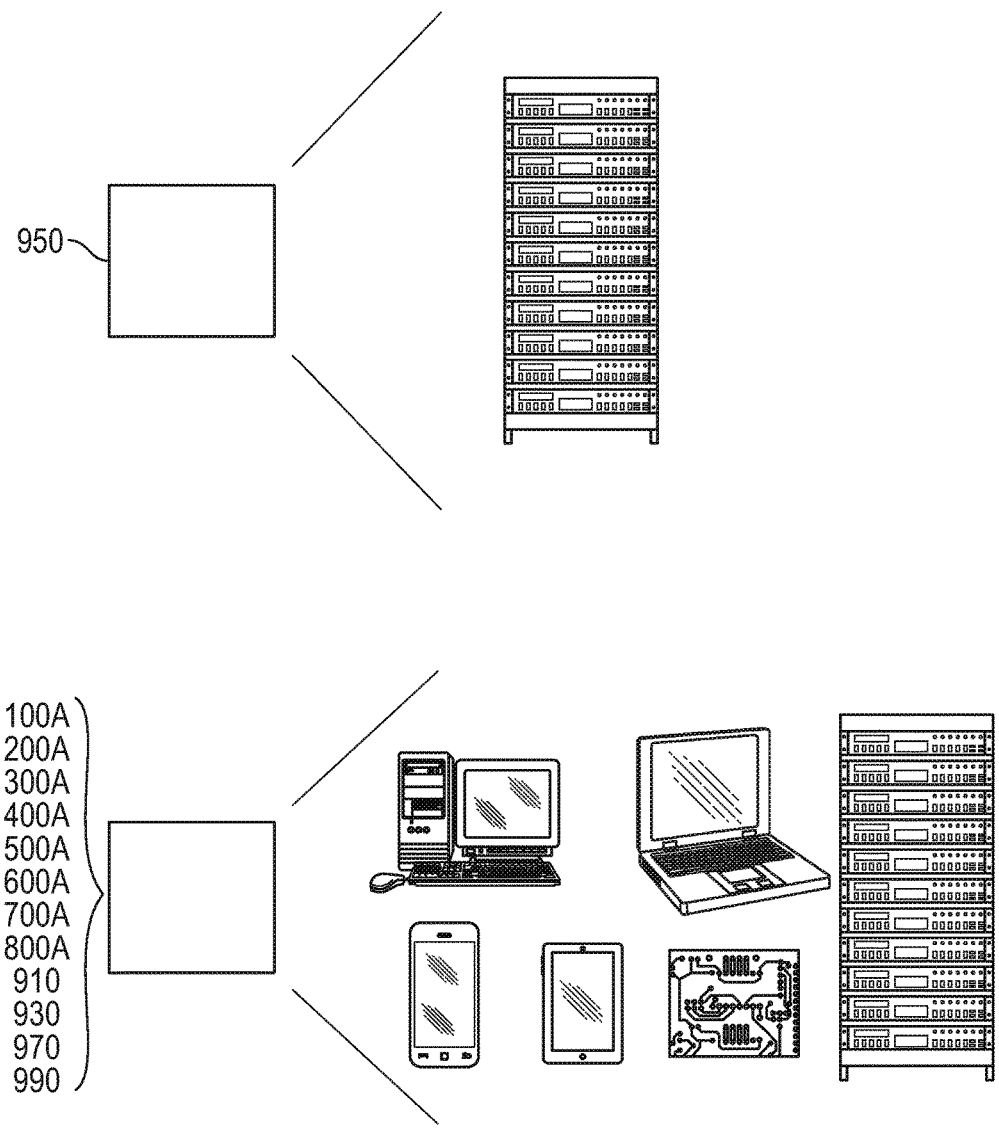
FIG. 9A is a schematic diagram that illustrates devices utilized initially represented in simple block form for FIGS. 1,2,3,4,5,6,7,8, and 9.

FIG. 9A is a schematic diagram that illustrates devices utilized initially represented in simple block form for FIGS. 1,2,3,4,5,6,7,8, and 9. More specifically, FIG. 9A further illustrates and demonstrates actual and various devices using exploded view callouts from that depicted in the schematic diagram shown in FIG. 9 and described above (in e.g. FIGS. 1-9). For FIG. 9, items 950 primarily represents DASA databases. In addition the list of devices associated with callouts 100A, 200A, 300A, 400A, 500A, 600A,700A, 800A, 910,930, 970, and 990 in FIGS. 1-9) can also represent DASA database(s) as well as user devices and/or access devices including desktop or stand-alone computer terminals replete with hard drives, laptop computers, cellular or smart telephones, computer tablets such as the iPad® and even printed circuit boards or integrated circuits (ICs).

Further, elaborating on the virtual user devices as described above, these can be created and are shown as real output device(s). It remains important to understand that these real devices can be used to create virtual user devices.

As stated above, further examples of "many to many" connections are also included herein as communication data connections from 950 to the list of 100A, 200A, 300A, 400A, 500A, 600A,700A, 800A, 910,930,970, and 990 devices. Data communication amplifiers, repeaters, and/or range extenders which optionally assist in ensuring signal integrity and strength, over various communication distances can be located in the data communication flow paths connecting the DASA databases, user devices, and/or access devices.

In addition, using a similar or identical process as just described above for securely transmitting storing, sealing, and retrieving data, the location of the data storage can be provided within any existing storage device associated with this system. That includes devices internal or external to the network and associated transceivers.

This disclosure provides for a complete random set of encryption keys using a random number generator that is normally computer aided. The key selectors are random resulting in random encryption and decryption keys that can be located in cypher data files and result data files.

For data on the move the systems described can generate one or more encryption keys which may be random. These encryptions keys are utilized throughout the system to encrypt the data along with sending the key selector (locater) to the receiver, which then utilizes the key selector to decrypt the data. Once decryption is performed, the key selector is no longer required. The key selector at the transmitter and receiver are temporary and only required during data in transit. In summary, it is important to understand that the system does not require encryption keys except during data transmission so that no intermediate encryption keys are required to be stored either. None of the keys or key selectors require storage and can all be temporary.

Streaming data, in this case, can utilize completely random keys in the encryption/decryption process (not requiring any synchronization) but still utilize synchronization features with the multiple rolling/ratcheting key encryption system.

For data at rest, having random access to the data files along with the ability to have continuously changing keys throughout the encrypted data files and not having to store any of the keys or key selectors/locators for the data at rest, provides keys that are implicit. In this manner the key selectors can be implicit in that the data is stored in a typical data file. The data files are actually blocks, each block having its' own specific size and operating system that manages all the data. Since the block location is known, the key selector is implicitly derived from a direct relationship with the known block position. In able to read/write data, one must know the location of the block, and therefore the key is implicit. In the case of the use of databases, it is valuable to store the key selector(s) in the database (in the index itself) and the key selector is utilized when reading or writing data to the database and to the record selector. It is also possible to have record selectors/locaters in rows and columns in the database to explicitly generate encryption keys for every cell of data in the database. Within the cell one can apply the rolling key encryption to each cell.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more devices that encrypt data transmitted to or decrypt data received from or both transmit said data to and decrypt said data received from said devices that utilize one or more master keys comprising:
    at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory;
    at least one encrypter or decrypter or both an encrypter and a decrypter that encrypt or decrypt or both encrypt and decrypt said data or associated data files or both said data and said associated data files that utilize one or more master keys and one or more key selectors, where one or more key selectors provide selection and provision of one or more encryption keys for each segment of bit by bit data or byte by byte data or both bit by bit data and byte by byte data, wherein said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files,
    and wherein said key selectors are also encrypted and decrypted,
    and wherein said key selectors and said created cipher data and said created cipher data files produce result data and result data files where said created cipher data and said created cipher data files together with said result data and said result data files are sealed to produce encrypted data and encrypted data files that are only encrypted and decrypted with one or more said master keys and one or more said key selectors.

2. The one or more devices of claim 1, wherein said encryption keys or said key selectors or both said encryption keys and said key selectors are temporary.

3. The one or more devices of claim 1, wherein said encryption keys are symmetric or said encryption keys are asymmetric public and private key pairs or said encryption keys are both symmetric and asymmetric public and private keys.

4. The one or more devices of claim 1, wherein said encryption keys are paired directly with decryption keys.

5. The one or more devices of claim 1, wherein said key selectors are random which results in random encryption and decryption keys, wherein said random encryption and decryption keys are used to encrypt and decrypt data.

6. The one or more devices of claim 5, wherein said encryption and decryption keys are provided within said created cipher data files and said result data files.

7. The one or more devices of claim 1, wherein said encryption encrypts data at rest or data on the move or both data at rest and data on the move before, during, and after transmission of said data and wherein said transmitted data is communications data.

8. The one or more devices of claim 1, wherein said encryption keys are coded keys that can be decoded.

9. The one or more devices of claim 1, wherein said encryption keys are encrypted keys that can be decrypted.

10. The one or more devices of claim 1, wherein said key selectors are provided where said key selectors exist with or within a tolerance range or both with and within said tolerance range.

11. The one or more devices of claim 10, wherein said tolerance range is utilized to authenticate the validity of said key selectors.

12. The one or more devices of claim 1, wherein said encryption keys are dynamic encryption keys in that said dynamic encryption keys can continuously change form, address, specific position and location, within or external to or both within and external to said devices as well as provide intended functions.

13. The one or more devices of claim 1, wherein said devices are transceivers.

14. The one or more devices of claim 1, wherein said devices are real or virtual devices or both said real and said virtual devices.

15. The one or more devices of claim 1, wherein an operation of encryption of data within said devices require at least one dynamically selectable encryption system (DSES) encrypter, a master key used by a dynamically selectable encryption key generator together with a key selector value that produces a data encryption key (KE) in a dynamic fashion and
    wherein said key selector value is sent to a decryption token, wherein said (DSES) encrypter receives data and encrypts said received data according to at least one value corresponding with or contained by or both corresponding with and contained by said data encryption key (KE).

16. The one or more devices of claim 15, wherein said encrypted received data is accepted from said DSES encrypter and wherein a combination of said decryption token and said encrypted received data becomes available as encrypted communication signals.

17. The one or more devices of claim 15, wherein said DSES encrypter possesses a hidden portion or an indirect hidden portion or both a hidden portion and an indirect hidden portion.

18. The one or more devices of claim 15, wherein said data encryption key (KE) may be changed at any time based upon at least one value of said key selector that provides a key selector value.

19. The one or more devices of claim 15, wherein an encryption token encrypter encrypts said key selector value and produces a hidden decryption token that can be an indirect encrypted decryption token.

20. The one or more devices of claim 1, wherein for at least one configuration of said devices, said master key is a source for a first key derivation communication processor and a second key derivation communication processor wherein said first and second key derivation communication processor(s) utilize information from said master key to provide variants of an original master key.

21. The one or more devices of claim 20, where said first and second key derivation communication processor(s) are distinguishable from each other in that they use unique initialization vectors and computerized computations or initialization vectors or computerized operations to each produce uniquely different derived keys.

22. The one or more devices of claim 21, wherein said master key is provided to said first key derivation communication processor that is used by a dynamically selectable encryption key generator together with said key selector value to produce a data encryption key (KE) in a dynamic fashion.

23. The one or more devices of claim 1, wherein encrypted data is initially supplied in a form of plaintext.

24. The one or more devices of claim 1, wherein an operation of decryption of data within said devices requires at least one dynamically selectable decryption system (DSED) decrypter, a decryption token that becomes a key selector value, a master key used by a dynamically selectable decryption key generator that dynamically produces a decryption key (KD) wherein said (DSED) decrypter receives data and decrypts said received data according to a value that coincides with or is contained by or both coincides with and is contained by said decryption key (KD).

25. The one or more devices of claim 1, wherein a system comprising and utilizing a computing device encrypts data transmitted to or decrypts data received from or both transmits said data to and decrypts said data received from said one or more devices that utilize one or more master keys comprising;
  at least one dynamically selectable dynamic encryption encrypter (DSDES) with an indirect hidden portion where encryption or decryption of said data or both encryption and decryption of said data or said associated data files or both encryption and decryption of said data and said associated data files, utilizes both master keys and one or more key selectors,
  wherein said master keys and said key selectors produce a specific set of one or more encryption keys that encrypt or decrypt said data or both encrypt and decrypt said data or said associated data files or both encrypt and decrypt said data and said associated data files where one or more key selectors coincide with at least one value that directly corresponds with created cipher data or created cipher data files or both created cipher data and created cipher data files,
  and wherein said key selectors can also be encrypted and decrypted, and wherein said key selectors and said created cipher data and said created cipher data files produces result data and result data files where said created cipher data and said created cipher data files together with said result data and said result data files are sealed in that produced encrypted data and encrypted data files are only encrypted and decrypted by one or more master keys and one or more key selectors.

26. The one or more devices of claim 25, wherein one or more devices comprising and utilizing a computing device that encrypts data transmitted to or decrypts data received from or both transmits said data to and decrypts said data received from said one or more devices that utilize one or more master keys comprising;
  at least one dynamically selectable dynamic encryption decrypter (DSDDS) with an indirect hidden portion where encryption or decryption of said data or both encryption and decryption of said data or said associated data files or both encryption and decryption of said data and said associated data files utilizes both master keys and one or more key selectors,
  wherein said master keys and said key selectors produce a specific set of one or more encryption keys that encrypt or decrypt said data or both encrypt and decrypt said data or said associated data files or both encrypt and decrypt said data and said associated data files where one or more key selectors coincide with at least one value that directly corresponds with created cipher data or created cipher data files or both created cipher data and created cipher data files,
  and wherein said key selectors can also be encrypted and decrypted,
  and wherein said key selectors and said created cipher data and said created cipher data files produce result data and result data files where said created cipher data and said created cipher data files together with said result data and said result data files are sealed in that produced encrypted data and encrypted data files are only encrypted and decrypted by one or more master keys and one or more key selectors.

27. One or more devices that encrypt data transmitted to or decrypt data received from or both transmit said data to and decrypt said data received from said devices that utilize one or more master keys comprising:
  at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory;
  at least one dynamically selectable dynamic encryption encrypter (DSDES) with an indirect hidden portion that encrypt or decrypt or both encrypt and decrypt said data or associated data files or both said data and said associated data files that utilize one or more master keys and one or more key selectors, where one or more key selectors provide selection and provision of one or more encryption keys for each segment of bit by bit data or byte by byte data or both bit by bit data and byte by byte data, wherein said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files,
  and wherein said key selectors are also encrypted and decrypted, and wherein said key selectors and said created cipher data and said created cipher data files produce result data and result data files where said created cipher data and said created cipher data files together with said result data and said result data files are sealed to produce encrypted data and encrypted data files that are only encrypted and decrypted with one or more said master keys and one or more said key selectors.

28. One or more devices that encrypt data transmitted to or decrypt data received from or both transmit said data to and decrypt said data received from said devices that utilize one or more master keys comprising:

at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory;

at least one dynamically selectable dynamic encryption decrypter (DSDDS) with an indirect hidden portion that encrypt or decrypt or both encrypt and decrypt said data or associated data files or both said data and said associated data files that utilize one or more master keys and one or more key selectors, where one or more key selectors provide selection and provision of one or more encryption keys for each segment of bit by bit data or byte by byte data or both bit by bit data and byte by byte data, wherein said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files, and wherein said key selectors are also encrypted and decrypted, and wherein said key selectors and said created cipher data and said created cipher data files produce result data and result data files where said created cipher data and said created cipher data files together with said result data and said result data files are sealed to produce encrypted data and encrypted data files that are only encrypted and decrypted with one or more said master keys and one or more said key selectors.

29. A system with one or more devices that encrypt data transmitted to or decrypt data received from or both transmit said data to and decrypt said data received from said devices that utilize one or more master keys comprising:

at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory;

at least one encrypter or decrypter or both an encrypter and a decrypter that encrypt or decrypt or both encrypt and decrypt said data or associated data files or both said data and said associated data files that utilize one or more master keys and one or more key selectors, where one or more key selectors provide selection and provision of one or more encryption keys for each segment of bit by bit data or byte by byte data or both bit by bit data and byte by byte data, wherein said master keys and said key selectors produce a specific set of one or more executable encryption keys that encrypt or decrypt or both encrypt and decrypt said data or said associated data files or both said data and said associated data files where one or more said key selectors coincide with at least one value that directly corresponds with created cipher data or created cipher data files or both said created cipher data and said created cipher data files, and wherein said key selectors are also encrypted and decrypted, and wherein said key selectors and said created cipher data and said created cipher data files produce result data and result data files where said created cipher data and said created cipher data files together with said result data and said result data files are sealed to produce encrypted data and encrypted data files that are only encrypted and decrypted with one or more said master keys and one or more said key selectors.

* * * * *